(12) United States Patent
Richardson

(10) Patent No.: US 8,500,440 B2
(45) Date of Patent: Aug. 6, 2013

(54) BURNER BLOCK FOR PRODUCING FLAT FLAME

(75) Inventor: Andrew P. Richardson, Clinton, NJ (US)

(73) Assignee: Linde, Inc., Murray Hill, NJ (US)

( * ) Notice: Subject to any disclaimer, the term of this patent is extended or adjusted under 35 U.S.C. 154(b) by 910 days.

(21) Appl. No.: 12/401,040

(22) Filed: Mar. 10, 2009

(65) Prior Publication Data

US 2010/0167219 A1   Jul. 1, 2010

Related U.S. Application Data

(60) Provisional application No. 61/141,740, filed on Dec. 31, 2008.

(51) Int. Cl.
*F23M 3/02*   (2006.01)
*F23D 14/62*   (2006.01)
*F23D 11/10*   (2006.01)
*B05B 7/06*   (2006.01)

(52) U.S. Cl.
USPC ............... 431/8; 431/354; 239/423; 239/424

(58) Field of Classification Search
USPC ............... 431/8, 354; 239/423, 424
See application file for complete search history.

(56) References Cited

U.S. PATENT DOCUMENTS

| | | | |
|---|---|---|---|
| 2,589,804 A * | 3/1952 | Harris et al. | 431/78 |
| 5,567,141 A | 10/1996 | Joshi et al. | |
| 5,575,637 A | 11/1996 | Slavejkov et al. | |
| 5,975,886 A * | 11/1999 | Philippe | 431/165 |
| 6,176,702 B1 | 1/2001 | Mohr et al. | |
| 6,579,085 B1 | 6/2003 | Satchell, Jr. et al. | |
| 7,896,647 B2 * | 3/2011 | Kobayashi et al. | 431/159 |

* cited by examiner

*Primary Examiner* — Kenneth Rinehart
*Assistant Examiner* — William Corboy
(74) *Attorney, Agent, or Firm* — Joshua L. Cohen

(57) ABSTRACT

A burner for a melter is provided which includes a nozzle, a fuel stream moving through the nozzle, and an oxidant stream including an initial elliptical cross section and being external to the nozzle and surrounding the fuel stream for providing a combustion stream having a cross section transitioning from an elliptical cross section to a circular cross section to provide a flat flame from the circular cross section for combustion in the melter. A method for producing a flat flame is also provided.

14 Claims, 3 Drawing Sheets

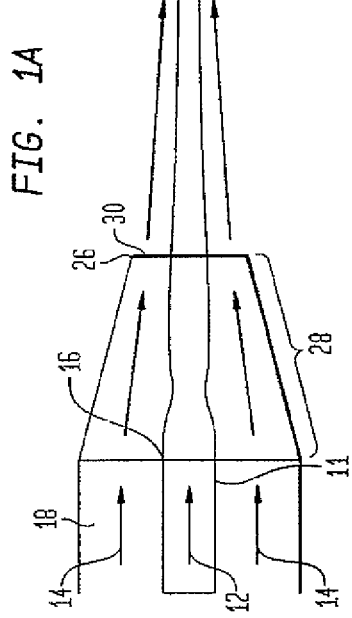
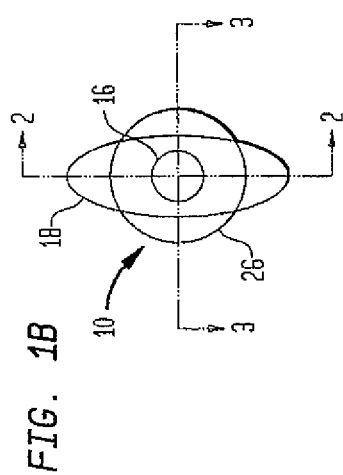
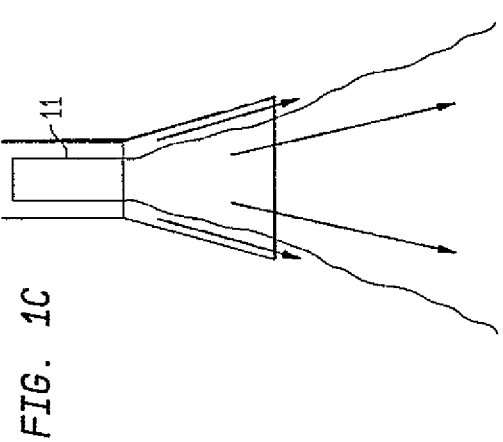

BURNER BLOCK FOR PRODUCING FLAT FLAME

The embodiments relate to burners used in melting furnaces and related processes.

Existing oxy-fuel burners that are designed to generate a flat or fan shaped flame typically have an opening into the furnace that has a horizontal width greater than a vertical height. These shapes are substantially slot-like or resemble a letter box. These shapes are a result of the initial wide aspect ratio of the flow shaping nozzle to produce the initial fan-shaped flow pattern and also the need to accommodate the horizontally expanding flow field. Compared to air-fuel combustion systems, burner block openings for the egress of oxy-fuel flames into the furnace melt chamber are small as a result of the smaller volumes of gases in oxy-fuel combustion and the higher velocities that can be maintained while maintaining a stable flame. The need for a wider horizontal opening typical for fan shaped flame oxy-fuel burners inherently requires a wider horizontal burner block than a conventional conical type flame oxy-fuel burner.

It is known that for furnaces in certain applications, e.g. glass making furnaces, viscous material may deposit or form on inner surfaces of the furnace and flow under its own weight in some circumstances. If this viscous material flowing down the furnace walls encounters an opening or hollow in the furnace wall it can react in different ways, depending on the nature of the opening. For example, if the opening forms a horizontal lip, the viscous material will tend to drip over the edge of the lip. If the opening is angled sufficiently, the viscous material may remain adhered to the wall and flow into the opening. If the opening is substantially circular, the viscous material may flow around the rim of the opening. As the majority of flat or fan shaped flame burners have a wide horizontal opening they tend to be subject to drips of material from the upper edge of the opening as the material cannot flow around the opening. As the material begins to drip over the upper edge of the burner block it encounters an outer oxygen rich stream typical in oxy-fuel burners. This oxygen rich stream has a temperature that is lower than that of the walls of the furnace and has the effect of cooling or freezing the viscous material and forming a solid build-up of same which is detrimental to furnace operations.

This "build-up" problem usually manifests itself in the form of "stalactites" on upper surfaces of a burner block opening, causing flow disruption and flame deflection, resulting in operational problems for the burner, the furnace and the overall melting process.

Flame deflection, if severe enough, can have the effect of intense local heating through flame impingement on the deposit or the refractory burner block, and destruction of the refractory burner block and furnace wall. This can be a dynamic destruction mechanism, as slight damage can lead to further flow disruption, further deflection and increased damage. The intense heat from flame impingement can also result in an increase in thermal radiation to the burner's metallic components and lead to further damage. A deflected flame can also have an effect on the intended flame pattern in the furnace, resulting in unpredicted operation and yielding, at best, non-optimal performance and at worst furnace damage.

As mentioned earlier, the final opening to the furnace for fan-shaped flames is relatively wide or elongated. As a result, the refractory burner blocks needed to contain the burner and opening tend to be relatively wide requiring a large opening be made into the furnace wall for installation. The construction of these large openings can be problematic, especially for installations in hot operating furnaces.

By eliminating the need for the large aspect ratio, letter-box opening typical in current flat flame or fan-shaped flame burners, the problems resulting from furnace wall run down and "build-up" are minimized, and significantly smaller burner blocks may be employed affording a simpler installation.

BRIEF DESCRIPTION OF THE DRAWINGS

For a more complete understanding of the present embodiments, reference may be had to the following detailed description taken in conjunction with the drawings, of which:

FIGS. 1A, 1B and 1C show different views of a burner embodiment;

DETAILED DESCRIPTION

Figure 2:
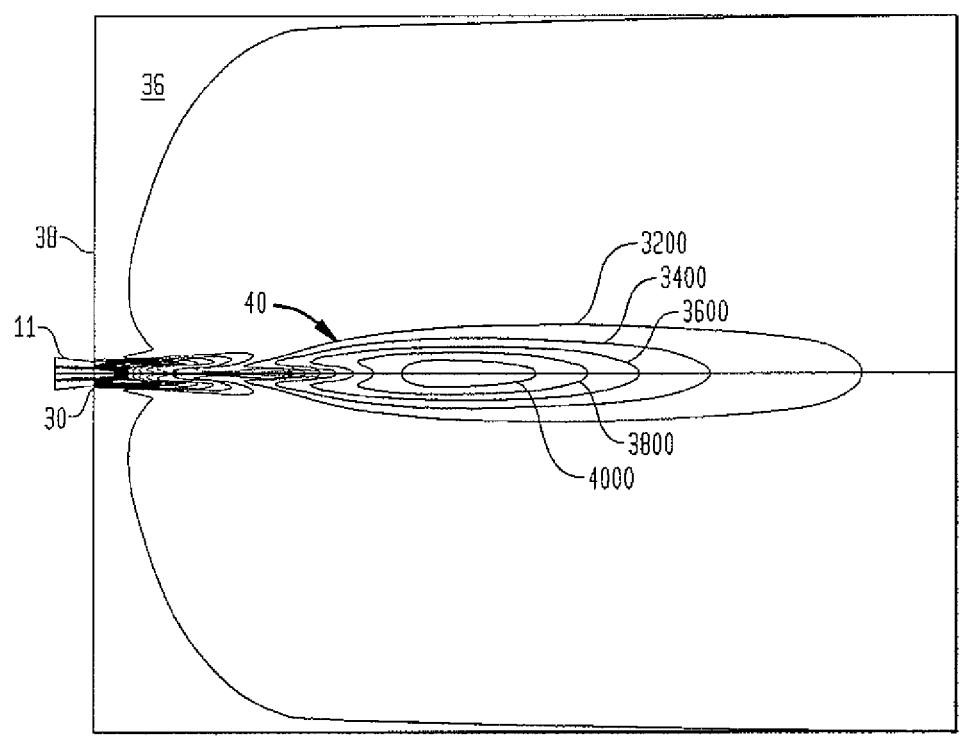
FIG. 2 shows a side view with contours of temperature (° F.) of a flat flame emitted from the embodiment of FIGS. 1A-1C.

The present embodiments provide for a method of producing a "flat flame" footprint from an elliptical flow passage transformed to a final circular cross section opening into a furnace atmosphere, and a burner for producing such flat flame.

The flat flame shape created by the burner and process of the present embodiments is provided by a burner block cavity that transforms from an elliptical cross-section at a tip of a fuel nozzle for the burner to a more circular cross-section at an exit or discharge orifice for the burner block through which the flame issues. See in particular FIGS. 1A-1C.

Referring to the FIGS. 1A-1C, the embodiments consist of a flow passage shown generally at 10 within a burner block (not shown) containing an oxygen ($O_2$) stream 14 that surrounds a fuel nozzle 11 from which a fuel 12 is discharged into said flow passage. Near a tip 16 of the fuel nozzle 11 an oxygen passage 18 for the transport of oxygen stream 14 is elliptical in shape with its major axis of the ellipse perpendicular to the substantially flat flame surface generated external to the burner block. At the tip 16 of the fuel nozzle 11 a flame is generated by the interaction of the fuel stream 12 and the oxygen stream 14. At the tip 16 of the fuel nozzle 11, the wall of flow passage 10 begins to transition its shape from an elliptical cross-section to a circular cross-section provided at a discharge end 26 of the flow passage. A transition portion of the flow passage is shown generally at 28, said portion 28 being constructed and arranged to provide the resulting circular cross-section opening 30 of the tip 26, such as shown in FIG. 1B.

Figure 3:
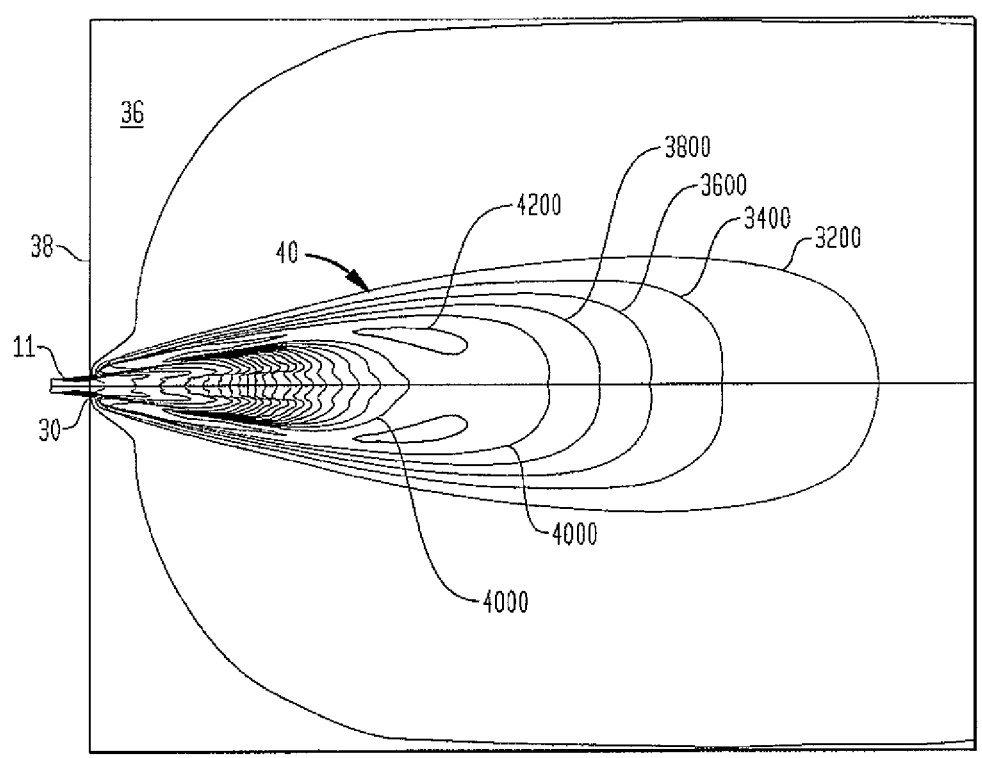
FIG. 3 shows a plan view with contours of temperature (° F.) of the flat flame in FIG. 2 emitted from the burner embodiment.

The streams 12,14 and hence flame, converge vertically and diverge horizontally as determined by the surface within the burner block resulting in a flame that issues from the burner block that continues to spread laterally as shown especially in FIG. 3.

The fuel can be either gaseous, e.g. natural gas; an atomized liquid, e.g. an oil spray or mist; or a suspended particulate, e.g. pulverized coal. More particularly, the fuel may include: a gaseous fuel selected from at least one of methane, natural gas, liquefied natural gas, propane, liquefied propane gas, butane, low BTU gases, town gas, producer gas and mixtures thereof; a liquid fuel selected from at least one of heavy fuel oil, medium fuel oil, light fuel oil, kerosene, diesel and mixtures thereof; or a particulate solid fuel selected from at least one of coal, coke, petroleum coke, rubber, woodchips, sawdust, straw, biomass fuels and mixtures thereof suspended in a carrier gas stream selected from at least one of air, nitrogen, carbon dioxide and a gaseous fuel, the gaseous fuel selected from at least one of methane, natural gas, liquefied natural gas, propane, liquefied propane gas, butane, low BTU gases, town gas, producer gas and mixtures thereof.

Oxidants for use with the embodiments include at least one selected from: oxygen-enriched air, containing from 20.9 volume percent oxygen to about 80 volume percent oxygen, such as produced by filtration, absorption, membrane separation, or the like; non-pure oxygen such as that produced by, for example, a vacuum swing adsorption (VSA) process and containing about 80 volume percent oxygen to 95 volume percent oxygen; and "industrially" pure (or industrial grade) oxygen containing about 90 volume percent oxygen to about 100 volume percent oxygen, such as that produced by a cryogenic air separation plant.

The result is that a nozzle and method is provided to produce a "flat flame" from a burner opening having a circular cross-section.

The fuel stream 12 may issue through a circular cross-section fuel nozzle or with an elliptical profile. Furthermore, for flame shaping purposes, the final cross-section need not be circular, but rather the cross-section transformation could continue to form a "horizontal" ellipse as opposed to a vertical ellipse.

Referring now to FIGS. 2 and 3, there is shown the flat flame that is produced by the flow passage 10. The flat flame is shown generally at 40 being discharged from the flow passage 10. The burner block containing flow passage 10 is arranged at a wall 38 (or crown) of a furnace or melter, such as for example a glass melter. A temperature profile is shown in degrees Fahrenheit (example 4,000 degrees F., 4,200 degrees F., etc.) with the flame 40. FIG. 2 shows a side view of the flat flame 40 along lines 2-2 of FIG. 1B, while FIG. 3 shows a plan view, either top or bottom, of the flame 40 along lines 3-3 in FIG. 1B. Accordingly, the flat flame 40 at FIG. 2 appears narrower, as shown by the reduced vertical dispersion of temperature contours from the axis of the flat flame 40. Flat flame 40 in FIG. 3, seen from above or below the flame, resembles a fan shape owing to the increased horizontal dispersion of temperature contours from the axis of the flame 40.

With the circular opening 30 at the tip 26, any material running down the walls of the furnace will tend to flow around the opening 30 of the burner block, as opposed to actually flowing into or dripping or flowing over the opening. The opening 30 may be co-planar with the wall 38, or the tip 26 may extend into a combustion chamber 36 of the furnace for the opening 30 to be further in the furnace.

The fuel stream 12 need not be located centrally within the oxygen passage 18. The fuel stream 12 may be located either above or below a centerline of the ellipse of the oxygen stream 14, thus feeding more oxygen either above or below the resulting flame. This would serve to generate a flame that is either fuel lean or fuel rich above the flame (and vice-versa, below). Such staging yields beneficial results by delaying combustion resulting in increased flame coverage so that a greater total amount of energy can be fired while avoiding localized overheating. Furthermore, control over the distribution of fuel and oxidant yields control over: location of heat release; flame shape and local flame stoichiometry; emissions such as NOx (as a proportion of the combustion will be conducted in a fuel rich or oxidant rich environment with subsequently lower local temperatures); soot formation which directly influences radiative flame heat transfer; and furnace atmosphere proximate the furnace charge and any influence thereon.

The burner embodiment is not limited to a single oxygen 14 and a single fuel stream 12. A plurality of stream arrangements can be disposed with respect to each other (either in separate or a common burner block). When configured such that the flame axis are substantially parallel or convergent, the interaction of the individually spreading flow fields will cause an enhanced rate of flame spread. By moving the fuel nozzle 11, which is constructed and arranged to move the fuel stream, such as vertically within each oxygen stream 14, the separate burners could run in a fuel rich or fuel lean manner yielding even greater control over the flame characteristics outlined above. Operating one set substantially fuel rich and another set fuel lean will cause the heat released near the furnace walls to be substantially lower and final heat release would only occur as the two flat-flames interact.

FIGS. 2 and 3 show an example of temperature distribution of natural gas being combusted for producing a flame from the present embodiments. A central fuel jet and surrounding oxygen jet move through the flow passage 10 and generate the thermal flow field as shown.

It will be understood that the embodiments described herein are merely exemplary and that a person skilled in the art may make many variations and modifications without departing from the spirit and scope of the invention. All such variations and modifications are intended to be included within the scope of the present embodiments as described and claimed herein. It should be understood that the embodiments described above are not only in the alternative, but may be combined.

What is claimed is:
1. A burner for a melter, comprising:
   a fuel nozzle having a fuel passage therein for a fuel stream and extending to a fuel nozzle tip having an elliptical cross section, the fuel nozzle constructed with the fuel nozzle tip transitioning to a circular cross section at a discharge orifice of said burner; and
   an oxidant passage surrounding the fuel passage and extending to an oxidant opening at the fuel nozzle tip, the oxidant opening having another elliptical cross section and being external to the fuel nozzle for transitioning from said another elliptical cross section to said circular cross section at said discharge orifice to provide a flat flame from the circular cross section for combustion in the melter.

2. The burner of claim 1, wherein the fuel stream comprises a circular cross section.

3. The burner of claim 1, wherein the fuel stream is displaceable vertically with respect to the oxidant stream for providing at least one of said streams to be fuel-rich and the other of said streams to be fuel-lean.

4. The burner of claim 1, wherein the fuel stream comprises a gaseous fuel selected from at least one of methane, natural gas, liquefied natural gas, propane, liquefied propane gas, butane, low BTU gases, town gas, producer gas and mixtures thereof.

5. The burner of claim 1, wherein the fuel stream comprises a liquid fuel selected from at least one of heavy fuel oil, medium fuel oil, light fuel oil, kerosene, diesel and mixtures thereof.

6. The burner of claim 1, wherein the fuel stream comprises a particulate solid fuel selected from at least one of coal, coke, petroleum coke, rubber, woodchips, sawdust, straw, biomass fuels and mixtures thereof suspended in a carrier gas stream selected from at least one of air, nitrogen, carbon dioxide and a gaseous fuel, the gaseous fuel selected from at least one of methane, natural gas, liquefied natural gas, propane, liquefied propane gas, butane, low BTU gases, town gas, producer gas and mixtures thereof.

7. The burner of claim 1, wherein the oxidant stream comprises an oxidant selected from at least one of oxygen-enriched air, non-pure oxygen and industrially pure oxygen.

8. A method of producing a flat flame from a nozzle for combustion in a melter, comprising:
moving a fuel stream through the nozzle,
moving an oxidant stream surrounding and external to the nozzle and having its major axis perpendicular to the fuel stream for having an elliptical cross section,
converging the fuel stream with the oxidant stream for providing a combustion stream emitted from the nozzle having an elliptical cross section, and
transitioning said combustion stream from said elliptical cross section to a circular cross section for providing a flame having a substantially flattened cross section for combustion in the melter.

9. The method of claim 8, further comprising displacing the fuel stream vertically with respect to the oxidant stream for providing at least one of said streams to be fuel-rich and the other of said streams to be fuel-lean.

10. The method of claim 8, wherein the fuel stream and the oxidant stream are co-axial.

11. The method of claim 8, wherein the fuel stream comprises a gaseous fuel selected from at least one of methane, natural gas, liquefied natural gas, propane, liquefied propane gas, butane, low BTU gases, town gas, producer gas and mixtures thereof.

12. The method of claim 8, wherein the fuel stream comprises a liquid fuel selected from at least one of heavy fuel oil, medium fuel oil, light fuel oil, kerosene, diesel and mixtures thereof.

13. The method of claim 8, wherein the fuel stream comprises a particulate solid fuel selected from at least one of coal, coke, petroleum coke, rubber, woodchips, sawdust, straw, biomass fuels and mixtures thereof suspended in a carrier gas stream selected from at least one of air, nitrogen, carbon dioxide and a gaseous fuel, the gaseous fuel selected from at least one of methane, natural gas, liquefied natural gas, propane, liquefied propane gas, butane, low BTU gases, town gas, producer gas and mixtures thereof.

14. The method of claim 8, wherein the oxidant stream comprises an oxidant selected from at least one of oxygen-enriched air, non-pure oxygen and industrially pure oxygen.

* * * * *